Feb. 22, 1966   W. R. DAVIS   3,235,920
TOOTHED SPLINE JOINT

Filed May 10, 1963   2 Sheets-Sheet 1

INVENTOR.
WILLIAM R. DAVIS
BY Lindsey, Dautzman and Hays
ATTORNEYS

Feb. 22, 1966  W. R. DAVIS  3,235,920

TOOTHED SPLINE JOINT

Filed May 10, 1963                                          2 Sheets-Sheet 2

INVENTOR.
WILLIAM R. DAVIS

BY Lindsey, Prutzman and Hayes

ATTORNEYS 3,235,920
TOOTHED SPLINE JOINT
William R. Davis, West Simsbury, Conn., assignor to The Stanley Works, New Britain, Conn., a corporation of Connecticut
Filed May 10, 1963, Ser. No. 279,396
4 Claims. (Cl. 20—92)

The present invention relates to fastening joints, and more particularly to improvements in joints of the type provided by a fastener inserted in slots formed in the contiguous surfaces of the joined members.

Joints of the type to which the present invention is directed have in the past been assembled by first inserting the fastener into the opposed slots formed in the joined members and by subsequently displacing the fastener along the slots for setting the joint, for which purpose teeth are provided on the fastener for engagement with the sides of the slots, the teeth being inclined to the contiguous surfaces of the joined members for bringing the members into abutment. Previously, the members have necessarily had to be spaced apart prior to the setting of the joint. Such spacing of the members is undesirable, particularly where they are significantly large, because of the difficulty in maintaining their alignment as they are brought into abutment, in setting the joint and in evenly distributing the joint preloading along the length thereof. It is therefore a principal aim of the present invention to provide a joint of the type described wherein the members to be joined can be brought into correct abutting relationship prior to the setting of the joint.

It is another aim of the present invention to provide a new and improved joint of the type described which has improved strength and wherein an evenly distributed joint preload is ensured.

It is a further aim of the present invention to provide a new and improved fastener for a joint of the type described adapted for convenient setting and providing a joint having increased strength and reliability over a long life span.

It is another aim of the present invention to provide a joint adaptable for ready assembly with a preselected preloading thereon.

It is a still further aim of the present invention to provide a new and improved joint which can be conveniently disassembled and subsequently reassembled with identical positioning of the fastener within the joint members and with a minimum reduction in joint strength.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

Figure 2:
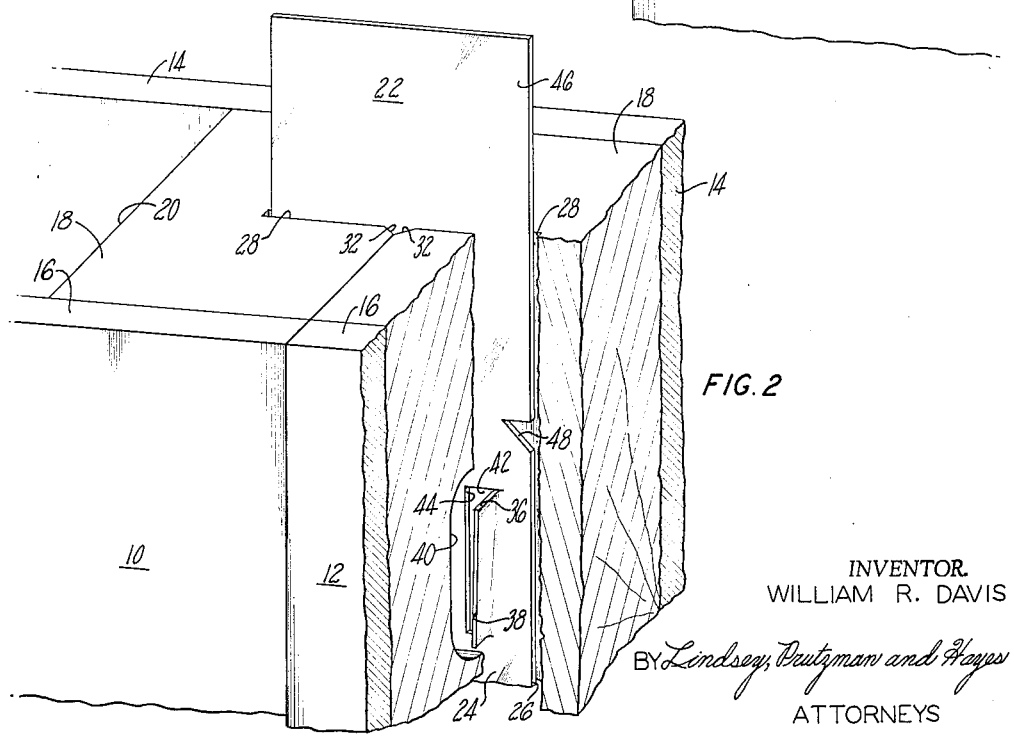
FIG. 2 is a perspective view, partly broken away, showing the joint of FIG. 1 partially assembled.

Referring now to the drawings in detail, the preferred embodiment of the joint of the present invention is shown for fastening a pair of panels 10, 12 constructed with a pair of face members 14, 16 and with elongated wooden edge members 18 affixed thereto for spacing the face members and thereby increase the rigidity and strength of the panels and provide a panel insulating chamber 20. A fastener, generally denoted by the numeral 22, hereinafter termed a spline, is shown to include a substantially flat elongated body 24, preferably made of sheet stock spring steel, having elongated parallel edges 26. The spline 22 is adapted to be received within opposed slots or kerfs 28 formed, as by sawing, in the wooden edge members 18. The spline body 24 is shown to have a thickness substantially equal to the width of the kerf 28 so as to fit snugly therein, and as seen in FIG. 2, the kerfs have sufficient depth to receive the entire body of the fastener when the panel members 10, 12 are in abutting engagement. Additionally, the kerfs are provided with chamfered edges 32 for assisting the insertion of the spline into the kerfs.

A plurality of longitudinally spaced pairs of teeth 34 are carried by the spline body with each pair being symmetrically located with respect to the lateral center line of the spline. The teeth are preferably formed integrally with the spline body by cutting or slitting the body and deforming or bending a portion of the body outwardly to form a sidewise projecting tooth with a leading or forward cutting edge 36 and an outer edge 38. Selected teeth are preferably formed on each side of the spline body, there being shown three pairs of teeth offset from alternate sides of the spline body.

Figure 1:
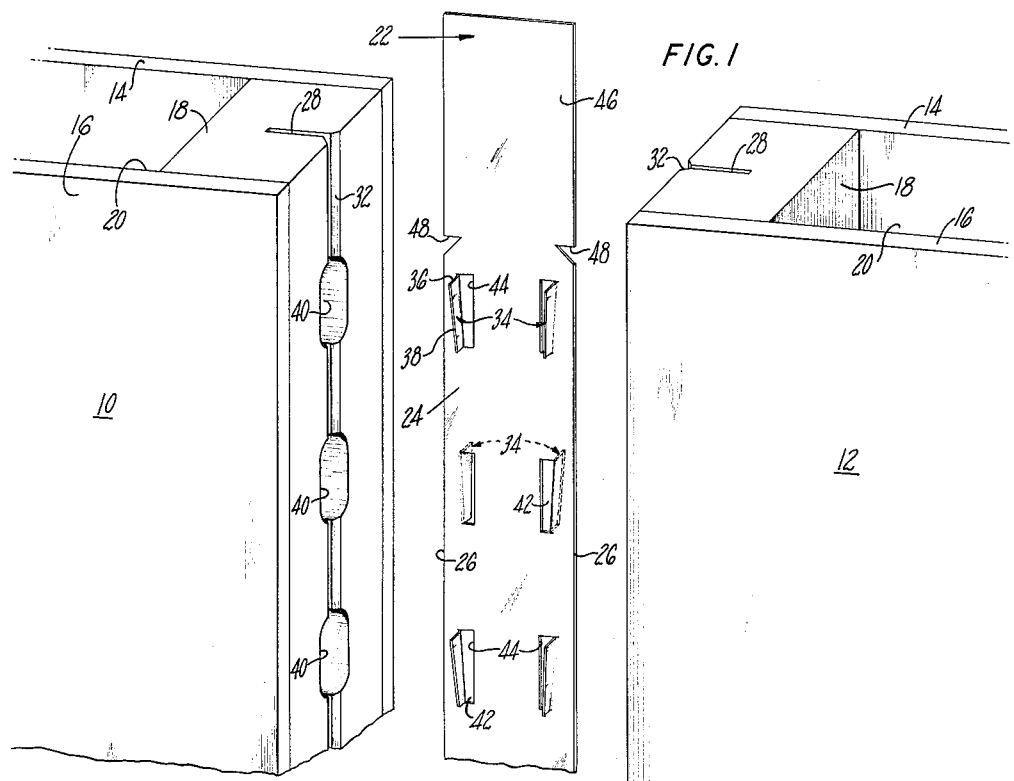
FIG. 1 is a perspective disassembled view, partly broken away, of a preferred embodiment of the joint of the present invention.

The teeth extend longitudinally rearwardly from the forward cutting edges 36 at the same acute angle with the lateral center line of the spline, and, upon engagement with the sides of the kerfs 28 and upon forward longitudinal displacement of the spline body in the kerf, in the upward direction as shown in FIG. 1, the teeth coact with locking grooves cut thereby in the edge members 18 to bring about a lateral force on the panels urging them together. Thus, the coaction between the teeth and the locking grooves in the edge members provides for fastening the panels, with the preloading on the panels being in part determined by the longitudinal displacement of the spline teeth 34 within the kerfs.

In accordance with the present invention, a plurality of longitudinally spaced pockets 40 are formed, as by a router, in the edge members 18 and along the kerfs 28. These pockets 40 are spaced in accordance with the longitudinally spacing of the teeth 34 and are adapted to freely receive the teeth during the lateral assembly of the spline within the kerfs, thereby enabling the panels to be brought into abutting relationship (FIG. 2) prior to the setting of the spline 22. Previously, the joint was united by first assembling the spline laterally in the kerfs until the teeth 34 engaged the edge members 18 and thereby develop sufficient resistance to prevent further lateral movement of the spline, and then longitudinally either by pulling or driving the spline with appropriate tools so that the tooth edges cut corresponding locking grooves in the edge members 18 leading from the face of the edge member, or from the chamfered edge 32 where provided. The members to be joined were therefore spaced apart during the setting of the spline and, accordingly, during the longitudinal displacement of the spline the panels had to be appropriately guided and aligned during their lateral displacement into abutment. In such assembly, it has been found that, in addition to the difficulty of properly guiding the panels into abutment during the setting of the spline, spline teeth 34 do not always simultaneously begin to cut the locking grooves, with the result that the preloading on the assembled panels is not always evenly distributed along the length of the joint. Further, it is somewhat difficult to accurately determine when a desired or optimum preload on the joint is obtained.

By allowing the panel members to be brought into abutment prior to the setting of the spline fastener, it can be seen that the aforementioned problems are solved and even distribution of the joining forces and proper alignment of the panels is ensured. Thus, after the spline is assembled in the kerfs with the teeth 34 received in the pockets 40 and the panels in abutment (FIG. 2), the joint can be readily set by forward longitudinal displacement of the spline, upwardly as seen in FIGS. 1 and 2, whereby the teeth 34 will simultaneously cut locking grooves in the sides of the kerf. Preferably, the spline is longitudially displaced a distance of at least equal to the length of the locking teeth 34 so as to bring the entire tooth into play for holding the panel members 10, 12, the length of the teeth 34 and the inclination thereof with respect to the longitudinal axis of the spline being appropriately selected. It has been found that with a tooth angle of 3 degrees and with a tooth length of approximately 1½", the spline can be longitudinally displaced at least 1½" to bring the full tooth into play. However, the optimum displacement of the spline will depend upon the material used in the members 10, 12 and the preload to be placed upon the members.

Figure 3:
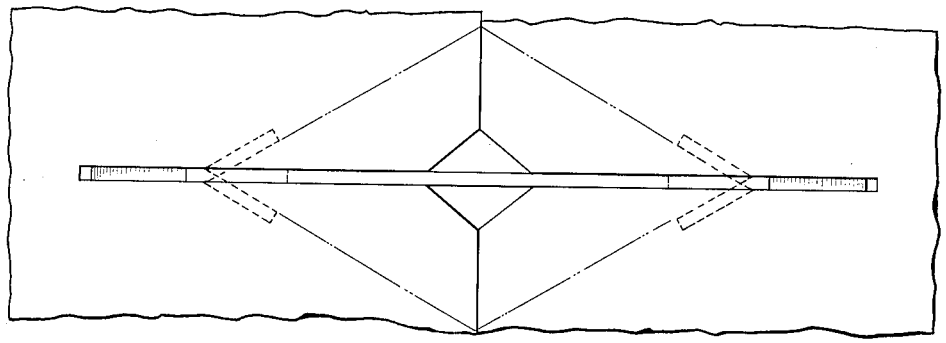
FIG. 3 is an enlarged transverse view, partly broken away, of a prior joint assembly.
Figure 4:
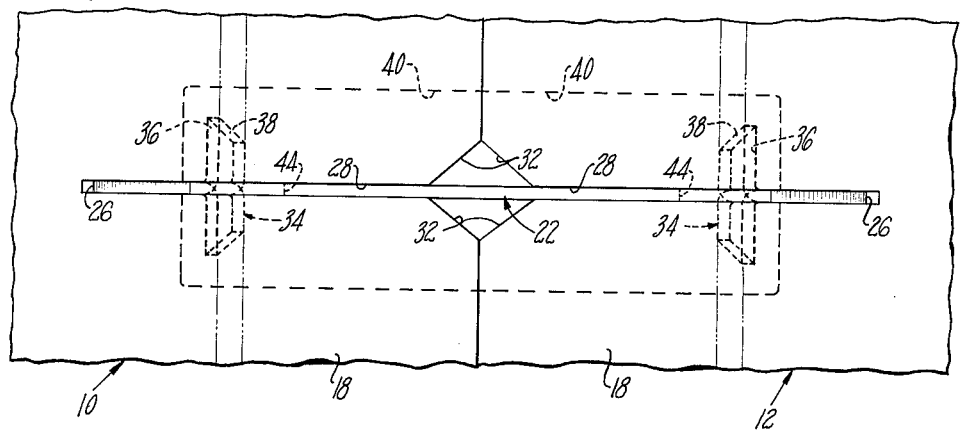
FIG. 4 is an enlarged transverse view, partly broken away, showing the joint of FIG. 2 completely assembled.

Preferably, the teeth 34 are flat with the tooth lip or body extending substantially normal to the plane of the spline body, and as seen in the drawings with the leading edge 36 extending substantially normal to the body of the fastener and therefore substantially in a laterally extending plane normal to the body of the fastener. Prior teeth, as shown in the joint of FIG. 3, are inclined inwardly at about 30 degrees to the plane of the fastener body. For any given tooth size, the upright teeth 34 are superior to the inclined teeth by providing a greater effective area through which the joint load can be transmitted. Additionally, the forces transmitted by the teeth 34 to the edge members 18 are such as to provide a greater force component normal to the abutting panel surfaces hereby giving a stronger joint with the same or less stress on the spline 22 and edge members 18. Further, it has been found that when rupture occurs due to overstressing the joint, where inclined teeth are used rupture will occur along the plane of the inclined tooth as shown in dotted lines in FIG. 3; whereas with the upright teeth of FIG. 4, rupture will occur along the plane of the upright tooth and substantially parallel to the plane of the abutting panels surfaces, as shown in dotted lines in FIG. 4. The use of a spline with upright teeth is therefore desirable especially where the joint members, as the panels shown, have a construction which more effectively resists rupture in the plane of the upright teeth than in the plane of the inclined teeth.

For reducing the frictional resistance between the teeth 34 and the locking grooves cut in the edge members 18, the outer tooth edge 38 is inclined inwardly from the leading edge 36, preferably at an angle of approximately 3 degrees. Setting of the spline fastener 22 is therefore readily accomplished with a minimum resistance with the edge member 18. The teeth 34, therefore, have a contour which enable them to be formed from the spline body and leave an opening 42 in the spline body 24 having an inner 44 extending parallel to the spline edges 26. The dimension between the openings 42 is, therefore, constant along the length thereof with the result that maximum spline strength for any given spline width is provided, it being understood that the portion of the spline body between the edges 44 of the openings 42 is the narrowest and therefore the weakest portion of the spline body.

For setting the joint by forward longitudinal displacement of the spline in the kerfs 28, there is formed integrally with the fastener body a forward end tab 46 which may be gripped by appropriate pulling tools to set the spline. The tab 46, as seen in FIG. 2, extends beyond the outer edges of the panel members 10, 12 after the initial insertion of the fastener in the kerf. By displacing the spline fastener upwardly a predetermined distance, the joint can be set with the desired preload and thereafter the tab 46 is ruptured from the spline body, for which purpose V-shaped grooves 48 are provided in the spline for assisting the tearing of the tab 46 therefrom.

It can, therefore, be seen that the joint of the present invention provides a highly improved fastening means which is particularly useful for attaching panel members. Greater joint strength is provided, even distribution of the joint preload is ensured, and the joined members can be properly aligned and abutted prior to the setting of the joint, thereby greatly facilitating the setting of the joint. Additionally, inasmuch as the joint preload is a function of the longitudinal displacement of the inclined teeth in the kerf, the preload can be readily established by appropriate selection of the setting displacement of the spline. Further, the fastener of the present invention has improved strength, is readily set with minimum resistance, and provides a given joint preload with a minimium stress on the fastener and joint members.

As will be apparent to persons skilled in the art, various modifications and adaptations of the structure above described will become readily apparent without departure from the spirit and scope of the invention, the scope of which is defined in the appended claims.

I claim:

1. A joint comprising a pair of members having opposed contiguous surfaces with opposed elongated continuous slots, a fastener having a body received within the opposed slots and a plurality of sidewise projecting teeth carried by the body, said teeth having cutting edges at a forward longitudinal end thereof extending outwardly of the fastener body, said teeth extending longitudinally rearwardly from said forward longitudinal end at an acute angle toward the contiguous surfaces, the continuous slots having enlarged portions forming a plurality of pockets for receiving the teeth respectively upon insertion of the fastener body into the opposed slots and reduced portions forward of the pockets having a width less than the thickness of the fastener including the fastener body and the sidewise projecting teeth for engagement of the sidewise projecting teeth with the sides of the slots, said pockets having a width greater than the combined thickness of the fastener body and the respective teeth received therein and a length greater than the length of the respective teeth, said pockets being structurally located to freely receive the teeth upon insertion of the fastener within the opposed slots and for substantially simultaneous engagement by the cutting edges of the teeth with the sides of the slots as the fastener is displaced in a longitudinal forward direction from its inserted position, said sidewise projecting teeth being forward of their respective pockets and with the teeth received within grooves cut by the teeth in the sides of the reduced portions of the slots as the fastener is displaced forwardly from its inserted position to provide coacting engagement by the teeth with the sides of the slots.

2. The joint of claim 1 wherein the fastener body and sidewise projecting teeth are of sheet metal construction.

3. The joint of claim 2 wherein the sheet metal teeth are substantially flat with said forward cutting edges lying substantially in laterally extending planes normal to the fastener body and outer edges inclined rearwardly toward the fastener body, said cutting edges being formed to cut said grooves in the sides of the slots as the fastener teeth are displaced forwardly of their respective pockets into coacting engagement with the sides of the reduced portions of the slots, said outer edges due to said rearward inclination toward the fastener body providing minimum restraint against said forward displacement of the fastener.

4. The joint of claim 3 wherein the substantially flat sheet metal teeth extend normal to the fastener body.

References Cited by the Examiner

UNITED STATES PATENTS

| | | | |
|---|---|---|---|
| 754,215 | 3/1904 | Hayward | 20—92 |
| 792,094 | 6/1905 | Ware | 20—92 X |
| 1,663,580 | 3/1928 | Andersin | 20—92 |
| 1,793,185 | 2/1931 | McChesney | 20—92 X |
| 2,562,779 | 7/1951 | Een | 20—92 |
| 2,846,737 | 8/1958 | Propst | 20—92.4 |
| 3,065,508 | 11/1962 | Pilloid | 20—92 |

FOREIGN PATENTS

| | | |
|---|---|---|
| 25,225 | 11/1919 | Denmark. |
| 30,724 | 11/1922 | Denmark. |

FRANK L. ABBOTT, *Primary Examiner.*

EARL J. WITMER, JACOB L. NACKENOFF,
*Examiners.*